United States Patent [19]

Tekulve

[11] Patent Number: 5,109,655
[45] Date of Patent: May 5, 1992

[54] ARTICULATING ROTARY MOWER

[76] Inventor: Daniel R. Tekulve, 2056 Shrine Rd., Batesville, Ind. 47006

[21] Appl. No.: 654,254

[22] Filed: Feb. 12, 1991

[51] Int. Cl.⁵ .......................................... A01D 75/30
[52] U.S. Cl. ........................................ 56/6; 56/13.6; 56/DIG. 10
[58] Field of Search ................ 56/6, 7, 13.6, 192, 56/DIG. 10

[56] References Cited

U.S. PATENT DOCUMENTS

| | | | |
|---|---|---|---|
| 2,753,674 | 7/1956 | Cunningham, Jr. et al. | 56/6 |
| 3,070,938 | 1/1963 | Winget | 56/6 |
| 3,135,079 | 6/1965 | Dunn | 56/DIG. 10 X |
| 4,601,162 | 7/1986 | Wessel | 56/6 X |

Primary Examiner—David J. Bagnell
Attorney, Agent, or Firm—Barnes & Thornburg

[57] ABSTRACT

A gang mower assembly comprising a rigid frame elongated in the direction of forward movement of the assembly, the frame including a forward end portion, a central portion, and a trailing end portion. A central rotary mower deck is disposed adjacent the central portion and a universal joint for connecting the central deck to the central portion for at least limited universal movement relative to the frame about axes generally parallel to the frame and generally perpendicular to the frame is provided. The assembly further comprises at least one outboard rotary mower deck and at least one inboard rotary mower deck, and ground-engaging wheels for individually supporting each deck for independent movement relative to the frame. Each of the decks comprises a rotary blade assembly defining a centrally located, upwardly extending rotary axis and pulleys mounted on the axis to provide an input drive for the blade assembly. Means for positioning each deck relative to its adjacent deck is provided, each positioning means comprising a rigid link having first and second opposite link ends, means for attaching the first link end to one of the decks and means for movably attaching the second link end to an adjacent deck for at least limited swivel movement. A belt drive system for providing a driving connection from a driver to the deck pulleys is provided to drive the rotary blade assembly of each mower deck.

29 Claims, 4 Drawing Sheets

ARTICULATING ROTARY MOWER

FIELD OF THE INVENTION

The present invention relates to gang mower assemblies, and more particularly to terrain-following gang mower assemblies comprising a plurality of rotary mower decks supported on wheels and articulated together to follow very rolling terrain, all of the rotary mower decks being driven by a common V-belt drive system. The present invention relates to the type of gang mower assembly which can be pulled by a conventional tractor and driven from the power take-off (PTO) unit conventionally provided on the tractor. The assembly comprises a plurality of rotary mower decks arranged in a generally straight line inclined at an angle with respect to the forward direction of movement of the assembly with the rotary decks being spaced apart along the line and sized to provide overlapping cuts as the assembly is moved forwardly. In the preferred embodiment of the present invention, each of the mower decks is provided with a rotary cutting blade which rotates about a centrally-disposed, upwardly-extending axis. V-pulleys are mounted on the mower decks and a common V-belt drive system is provided for driving the blades, even when the mower decks articulate relative to each other and the tractor to move over rather steep rolling land or steep, but small hills and valleys, such as those commonly found on a golf course rough. In this preferred system, a main V-belt drives one of the mower decks and other V-belts drive the other mower decks from the said one mower deck.

PRIOR ART

The prior art does not show a plurality of rotary mower decks hooked together so that the separate mower decks will move independently of each other with the deck blades driven by a common V-belt drive system comprising a V-pulley on each deck and a master drive pulley with V-belts interconnecting the various V-pulleys to provide driving power for the cutter blades.

The prior art efforts have included, for instance, putting a separate gasoline engine on each rotary mower deck so that the decks can articulate relative to each other to follow the terrain. Other efforts have included providing hydraulic motors on each mower deck with a plurality of hydraulic hoses connecting each hydraulic motor to a central hydraulic pump. In some instances, mechanics have tried to couple a PTO drive on a tractor to a plurality of mower decks by using a separately movable drive shaft coupled to each deck.

Prior to the present invention, it has not been possible to provide, for instance, five or even seven separate rotary mower decks all connected together and connected by a common frame means to a tractor which pulls the mower decks along uneven terrain and provides V-belt driving power for driving the cutter blades. The advantages of a V-belt driving system are many and well known. They are low-cost and easy for mechanics to repair and replace. The problem with the prior art is that it does not teach how to drive a plurality of independently movable, terrain-following mower decks using V-belts which will accommodate the deck articulation required.

SUMMARY OF THE INVENTION

The present invention, therefore, is a gang mower assembly comprising rigid frame means elongated in the direction of forward movement of the mower assembly, the frame means including a forward end portion, a central portion and a trailing end portion. A driver, such as a transmission which can be driven by the power take-off unit of a tractor, is provided and preferably mounted at or adjacent the forward end portion of the rigid frame means. A central rotary mower deck is disposed adjacent the central portion of the frame means and universal joint means is provided for connecting the central deck to the central portion of the frame means for at least limited universal movement relative to the frame means about an axis generally parallel to the frame means and an axis generally perpendicular to the frame means. At least one outboard rotary mower deck is disposed to the right of the central deck and at least one inboard rotary mower deck is disposed to the left of the central deck. Within the present invention, two or three or even more outboard rotary mower decks may be provided connected to the central deck and two or three or more inboard rotary mower decks may be provided connected to the central deck. In other words, the present invention may comprise, for instance, five separate rotary mower decks or seven separate rotary mower decks or, for that matter, any number of rotary decks which can be practically hooked together in accordance with the present invention.

Ground-engaging wheel means for individually supporting each of the central, outboard and inboard decks for independent movement relative to each other and relative to the frame means are provided. Each of the decks comprises a rotary blade assembly defining a centrally-located, upwardly-extending rotary axis and pulley means mounted on the axis to provide an input drive for the blade assembly. Means for positioning each deck relative to its adjacent deck is provided, each of the positioning means preferably comprising rigid link means having first and second opposite link ends. Means for rigidly attaching the first link end to one of the decks and means for movably attaching the second link end to an adjacent deck for at least limited swivel movement are provided. Then, with the connections between the frame means and the mower decks so arranged, the present invention comprises belt drive means for providing a driving connection from the driver to the pulley means, thereby to drive the rotary blade assembly of each mower deck.

The mower assembly may further comprise a first arm link means for providing a positioning and driving connection between the forward end portion of the frame means and one of the outermost outboard decks and a second arm link means for providing a positioning and driving connection between the trailing end portion of the frame means and one of the innermost inboard decks. Each arm link means has a proximal end adjacent the frame means and a distal end adjacent the deck connected thereto, and means is provided for connecting each arm link means for pivotal movement about its proximal end about an axis generally parallel to the frame means and further means is provided for connecting each arm link means for pivotal movement about its distal end to its associated deck about an axis generally parallel to the frame means. These arm link means, consequently, move an outermost outboard deck and an innermost inboard deck in the direction of movement of the frame means.

The mower assembly, as indicated above, has the mower decks in a straight line inclined at an angle relative to the main frame means or the forward direction of travel. The upwardly extending axes of the rotary blade assemblies are disposed generally in an upwardly extending reference plane positioned at generally the same angle relative to the frame means, and the mower decks are spaced apart along that plane. Each mower deck has a size such that the rotary cut it provides overlaps the cut of its adjacent mower deck upon forward movement of the frame means. Each of the rigid link means of the positioning means extends generally in the reference plane between adjacent decks. The belt drive means comprises a belt trained about the pulley means of adjacent mower decks to have a set of parallel belt runs extending between adjacent mower decks, one of the rigid link means being disposed between each set of belt runs. Each rigid link means comprises cooperating slide and guide end portions providing, respectively, the first and second opposite link ends, and adjustable belt take-up means is provided for selectively rigidly positioning the end portions to provide selected tension on adjacent and associated belt runs.

The mower assembly is further arranged such that the means for movably attaching the said second link end to an adjacent deck comprises a post extending rigidly upwardly from the adjacent deck and a swivel sleeve receiving the post. The swivel sleeve is rigidly mounted on the second link end, and has an internal diameter defined by an upwardly-opening upper frustoconical portion and a downwardly opening frustoconical portion, the upper and lower frustoconical portions connecting together to provide a common central opening sized slidably to receive the post and to provide a pivot about the post limited by the upper and lower frustoconical portions. In the preferred embodiment, this central opening is generally aligned with the associated and adjacent belt runs and the vertical centers of the pulley means about which the belt runs are trained. Further, in the preferred embodiment, the post providing the swivel axis for the swivel sleeve is located generally on a vertical axis extending generally upwardly from a line extending between the ground points of contact of the front wheel means and the right-rear wheel means. This permits movement of the deck upon which the post is mounted to move generally about the line between the said ground points of contact of the front wheel means and right-rear wheel means within the limits permitted by the swivel sleeve on said post.

The present invention, therefore, is a gang mower assembly comprising a plurality of rotary mower decks connected together as a gang mower with adjacent decks staggered to provide overlapping cuts when the mower is moved in the forward direction. Each mower deck comprises a rotary blade assembly defining a centrally-located, upwardly-extending rotary axis and pulley means mounted on the axis to provide an input drive for the blade assembly. Means are provided for positioning each mower deck relative to its adjacent deck, each positioning means comprising rigid link means having first and second opposite link ends, and means for rigidly attaching the first link end to one of the decks and means for movably attaching the second link end to an adjacent deck for swivel movement are provided. The rigid link means lie generally in a straight line generally intersecting the rotary axes of the mower decks and the decks are spaced along this straight line. Ground-engaging wheel means for individually supporting each of the decks for independent terrain following movement are provided. A line drawn between the ground points of contact of the front wheel means and the right-rear wheel means will generally pass directly under the means for movably attaching the second link end to an adjacent deck for swivel movement.

Figure 1:
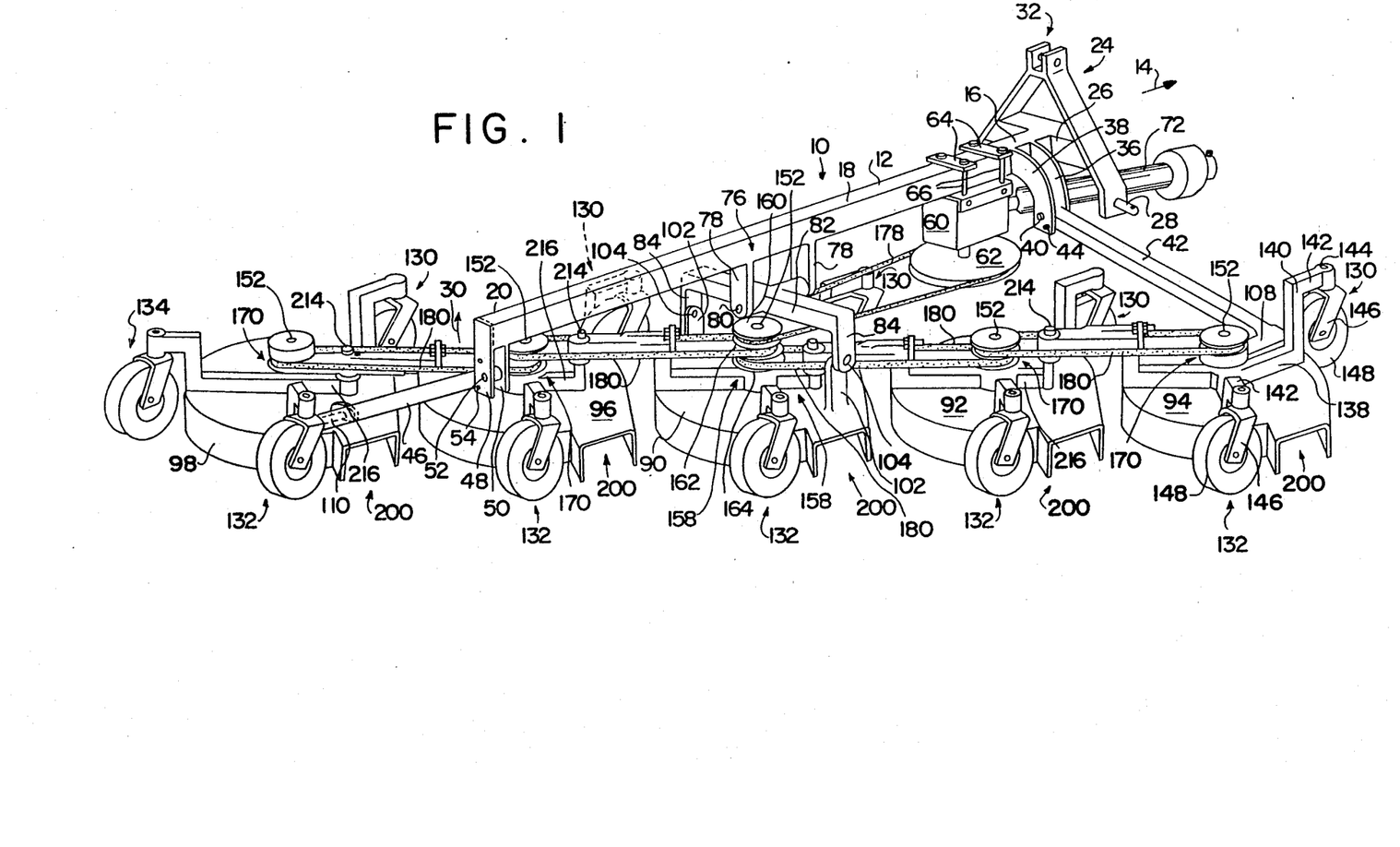
FIG. 1 is a perspective view of the mower assembly of the present invention.
Figures 2, 4:
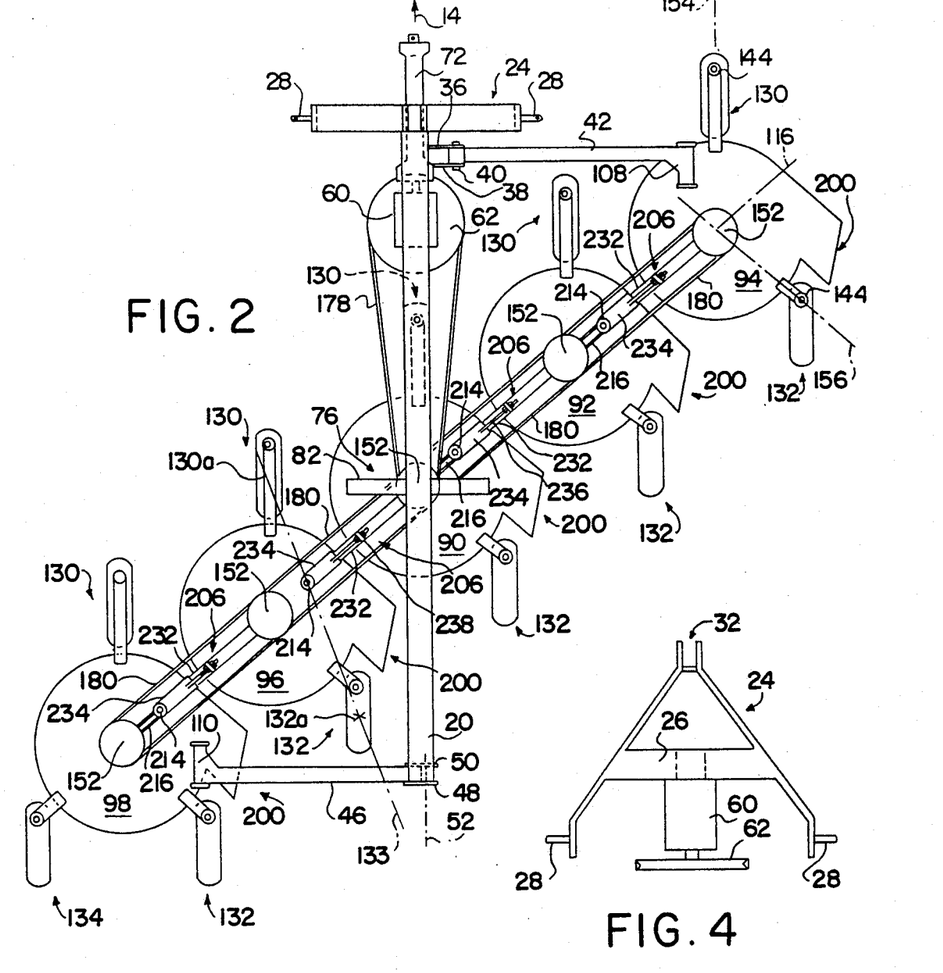
FIG. 2 is a top plan view of the mower assembly of the present invention.
FIG. 4 is a front end view of the main frame taken from the right-hand side of FIG. 3.

Referring now specifically to the drawings, it will be seen that the mower assembly 10 of the present invention is illustrated in perspective in FIG. 1 to show the main frame means 12 which may be connected to a conventional tractor and pulled or moved generally in the forward direction as indicated by the arrow 14 (FIGS. 1 and 2). The main frame means 12 comprises a forward end portion 16, a central portion 18 and a trailing end portion 20. A conventional tractor hitch 24 is rigidly welded or otherwise fastened to the forward end portion 16, for instance, by the rigid brace member 26. This tractor hitch 24 has laterally outwardly-extending trunnion shafts 28 about which the frame means 12 will pivot upwardly as indicated by the arrow 30 (FIG. 1) when the upper portion 32 of the hitch is pulled forwardly in a conventional tractor hitch arrangement. This means that the main frame means 12 can be lifted upwardly to lift the mower assembly upwardly for transport.

Figure 3:
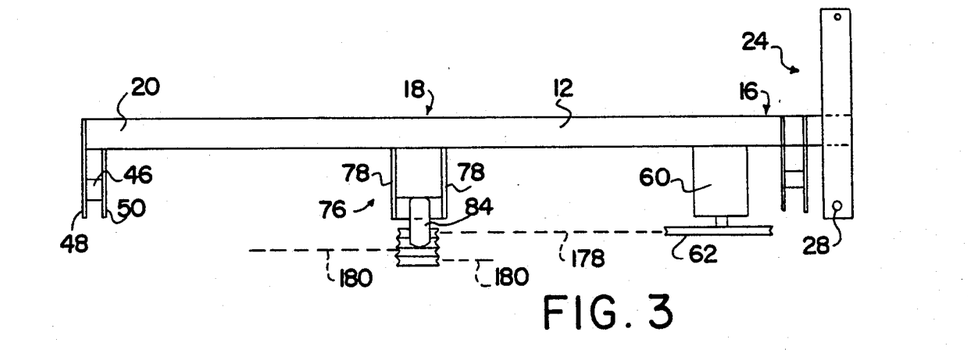
FIG. 3 is an elevation view of the main frame of the mower of the present invention.

The main frame means 12, shown in more detail in FIGS. 3 and 4, includes brackets 36 and 38 extending outwardly to the right as shown to support a trunnion 40 about which a first arm link means 42 is pivoted for movement. A stop 44 is provided for limiting the downward movement of the arm link means 42 as best seen in FIG. 1. The axis of the trunnion 40 is generally parallel to the direction of elongation of the frame means 12. Similarly, a second arm link means 46 is pivotally supported at the trailing end portion 20 of the frame means 12 by depending brackets 48, 50 supporting a trunnion 52 about which the link means pivots. A stop 54 is provided to control the downward movement of the link means 46. As best seen in FIG. 2, the frame means 12 with the outwardly-extending arm link means 42, 46 will move forwardly and the link means, which will serve a purpose to be discussed hereinafter, will move forward with the frame means, but be capable of pivotal movement about their respective axes parallel to the frame means.

A driver 60 with an output pulley 62 is mounted on the forward end portion 16 of the frame means 12, for instance, by the plates 64 and bolts 66. This driver 60 may preferably be a transmission having an output shaft extending vertically downwardly and upon which the pulley 62 is mounted. In a conventional fashion, the shaft 72 from a conventional tractor power take-off is coupled to the driver 60 to provide driving power for the V-pulley 62.

Universal joint means 76 is located in the central portion 18 region of the main frame to extend downwardly as best illustrated in FIGS. 1 and 3. The illustrative universal joint means 76 comprises downwardly-extending brackets 78 providing a trunnion support 80 which extends forwardly in the direction of the arrow 14 and generally parallel to the main frame means 12. Mounted on this trunnion support 80 is a yoke 82 having downwardly-extending side brackets 84, also best seen in FIGS. 1 and 3.

A central rotary mower deck 90 is provided preferably beneath the universal joint means 76 to be connected to the downwardly-extending brackets 84. Outboard (to the right as viewed in FIGS. 1 and 2) mower decks 92 and 94 are provided along with inboard mower decks (to the left as viewed in FIGS. 1 and 2) 96 and 98. The outermost outboard mower deck 94 is also the forwardmost mower deck as best seen in FIG. 2 while the innermost inboard mower deck 98 is also the rearwardmost deck as best seen in FIG. 2. The central mower deck 90 is provided with upwardly-extending side brackets 102 which are connected, respectively, to the downwardly-extending side brackets 84 on the yoke 82 by means such as the illustrated trunnions 104 to complete the universal joint connection. This means that the central deck 90 is universally movable, at least to a limited extent, about the axis of the trunnion support 80 which is parallel to the main frame 12 and about the axis of the trunnions 104 which is perpendicular to the main frame 12. While the central deck 90 is permitted this at least limited universal joint movement, it will be clear that the deck 90 will travel forwardly with the main frame 12 when the tractor moves the main frame. The universal joint means 76 will permit the central deck 90 to follow the terrain on which it is supported. The arm link means 42 is connected to the deck 94 for pivotal movement about a forwardly-extending axis as indicated at 108 and the arm link means 46 is connected to the deck 98 for pivotal movement about a forwardly-extending axis as indicated at 110. Because of stops 44 and 54 for the arm link means 42, 46, respectively, lifting the frame means 12 as indicated by the arrow 30 will lift the decks 94 and 98.

Turning to FIG. 2, it will be seen that the rotary mower decks 90, 92, 94, 96, 98 are in a straight line indicated by the center line 116 which is inclined at an angle relative to the main frame means 12 and the directional arrow 14. As will be more fully described hereinafter, this straight line 116, best seen in FIG. 2, will intersect the centers of the mower decks 90, 92, 94, 96, 98 and the drive shaft axes provided thereby. It will also be seen that, at least when the mower assembly is on level terrain, the upwardly-extending drive shaft axes for the mower decks will lie generally in a common upwardly-extending plane including the line 116, which plane is inclined relative to the frame means 12.

Each mower deck 90, 92, 94, 96, 98 is supported on ground-engaging wheel means 130 at the front and wheel means 132 at the rear, right-hand quadrant as best seen in FIG. 2. (The innermost inboard deck 98 may also be supported by ground-engaging wheel means 134 as best illustrated in FIGS. 1 and 2.)

Figures 9, 10:
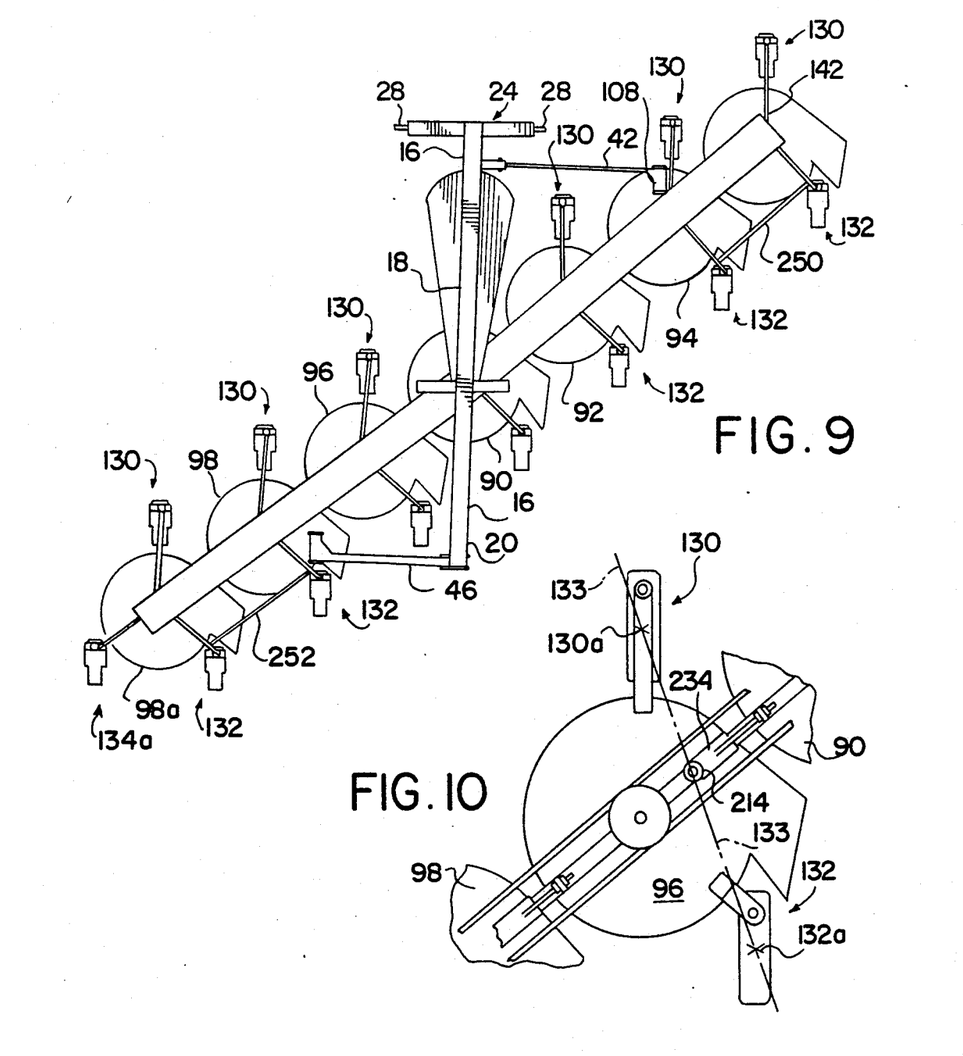
FIG. 9 is a diagrammatical plan view showing seven rotary mower decks assembled together in accordance with the present invention.
FIG. 10 is a diagrammatical plan view of one rotary deck and its adjacent decks showing the relationship of the ground points of contact for the front and right-rear wheel means relative to the articulation connection between adjacent decks.

Each such wheel means 130, 132 may preferably be connected to its associated mower deck by rigid structural members 138, 140, 142 best seen, for instance, at the right-hand side of FIG. 1. These structural members 138, 140, 142 may preferably be welded together and welded to the deck to provide a rigid and outwardly-extending support for a trunnion such as indicated at 144 for a yoke 146 for a wheel 148. In FIGS. 1 and 2, the upwardly-extending axes of each mower deck 90, 92, 94, 96, 98 are indicated by the reference numeral 152. The upwardly-extending trunnions 144 of the wheel means 130, 132 are disposed relative to the axis 152 of the mower deck as best seen in FIG. 2. Considering the outermost outboard deck 94 at the right-hand portion of FIG. 2, it will be seen that a line drawn from its axis 152 parallel to the frame means 12 will pass through the center of the trunnion 144 of its front wheel means 130, the line being indicated by the reference numeral 154. Similarly, a center line 156 drawn between the axis 152 and the center of the trunnion 144 for the rear wheel means 132 (FIG. 2) will show an important angular relationship relative to the straight line 116 discussed above. Essentially, the acute angle between the line 154 and the line 116 is the same as the acute angle between the line 154 and the line 156. This means that the line 116 extends to the left and downwardly as viewed in FIG. 2 at the same angle that the line 156 extends downwardly and to the right. In FIGS. 2 and 10 the ground points of contact for wheel means 130 and 132 are indicated, respectively at 130a and 132a. That is, a center point of ground contact (looking downwardly) for each wheel means 130 and 132 is established by point 130a, 132a, and a line 133 may be drawn generally between these points. (In FIG. 2, for clarity, the line 133 and the points 130a and 132a are shown only for deck 96.) The purpose of these reference lines will become apparent as this description progresses.

Figure 5:
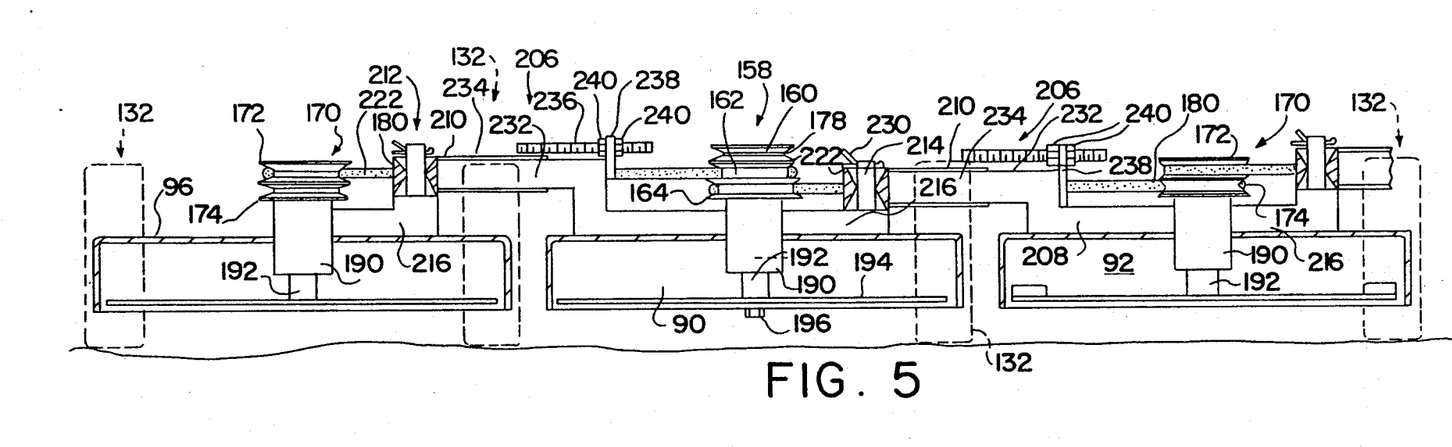
FIG. 5 is a fragmentary sectional view showing the mower assembly decks on generally level terrain and also showing how the decks are articulated together.
Figure 6:
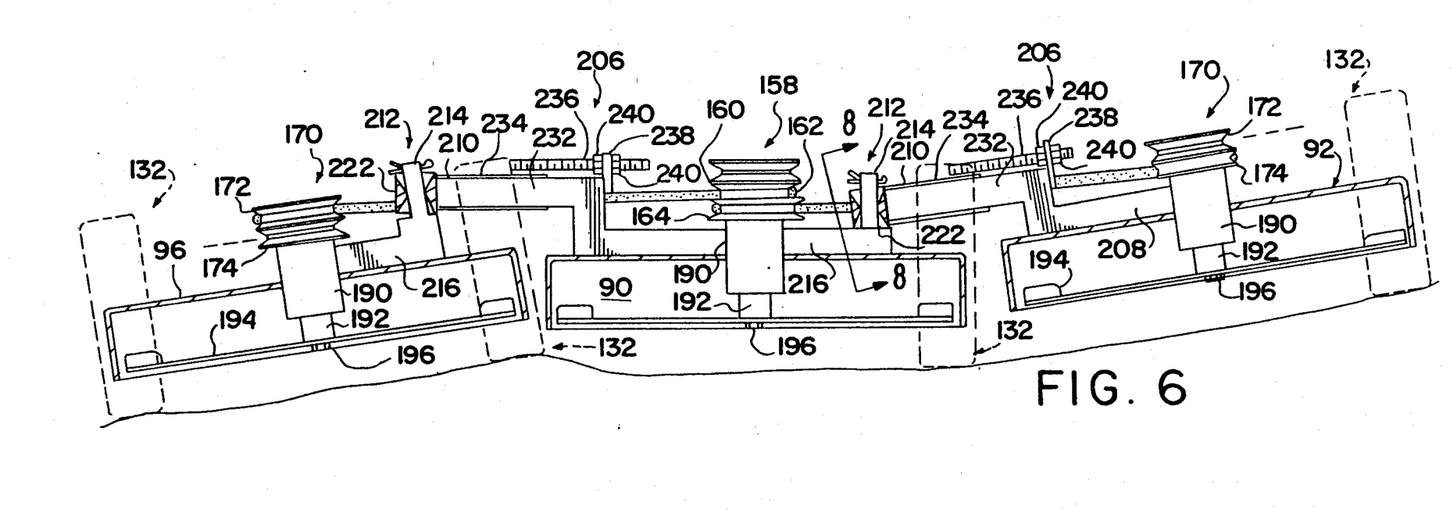
FIG. 6 is a fragmentary sectional view similar to FIG. 5 except it shows the mower decks on an uneven terrain.

The illustrative embodiment 10 shows the central deck 90 having V-pulley means 158 comprising three vertically-stacked V-pulleys 160, 162 and 164 as best seen in FIG. 1 and in FIGS. 5 and 6. Each of the mower decks 92, 94, 96, 98 is provided with V-pulley means, each of which has an upper V-pulley 172 and a lower V-pulley 174 as best seen in FIGS. 5 and 6. A main drive belt 178 is trained about the drive pulley 62 and the upper pulley 160 of the pulley means 158 on the central deck 90. Transfer belts 180 are then provided for coupling the outboard and inboard mower decks to the pulley means 158 of the central deck 90. Illustratively, the middle pulley 162 of the central deck 90 is drivingly connected to the upper pulley 172 of the inboard deck 96 while its lower pulley 170 is drivingly connected to the lower pulley 170 of the innermost inboard deck 98. Similarly, the bottom or lower pulley 164 of the pulley means 158 on the deck 90 is drivingly connected to the lower pulley 174 of the outboard deck 92 while the upper pulley 172 is drivingly connected by a belt 180 to the upper pulley 172 on the outermost outboard deck 94. Thus, the inboard and outboard mower decks are driven directly from the central deck V-pulley means 158 which, in turn, is driven by the drive pulley 62. This is the case even though the decks 90, 92, 94, 96, 98 are all permitted independently to move relative to each other and relative to the main frame means 12 which carries the drive pulley 62. The manner in which this belt drive of articulating mower decks is accomplished will become more apparent as this description progresses.

Figure 7:
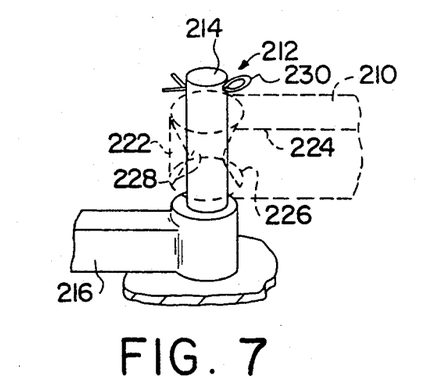
FIG. 7 is a fragmentary diagrammatical view showing in perspective how the swivel link connection providing the articulation illustrated in FIGS. 5 and 6 works.
Figure 8:
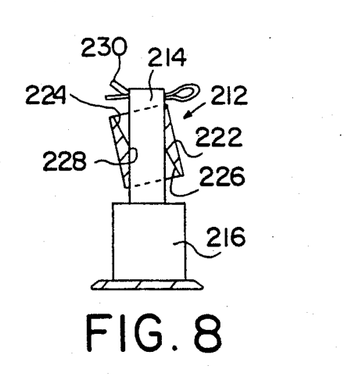
FIG. 8 is a fragmentary sectional view showing the view along the section line 8—8 in FIG. 6.

As best seen in FIGS. 5 and 6, each mower deck 90, 92, 94, 96, 98 comprises a bearing assembly 190 journal supporting a shaft 192 upon which the pulley means are mounted and to which the blade 194 is mounted by a bolt 196. It will be appreciated that the mower decks 90, 92, 94, 96, 98 are to a great extent, conventional rotary mower decks including a vertically-extending or at least upwardly-extending shaft 192 which drives a blade 194 to cut grass and discharge it from a discharge port 200. However, the mower decks 90, 92, 94, 96, 98 are configured to operate in the gang mower assembly 10 of the present invention to provide optimum results. For instance, the discharge ports 200 discharge outwardly and slightly rearwardly as best seen in FIG. 2 to eliminate the windrowing normally associated with gang mowers. Further, except for the innermost inboard mower deck 98 which is supported on three ground-engaging wheel means 130, 132, 134, each of the other mower decks 90, 92, 94, 96 is supported at its left rearward quadrant by rigid link means 206 which extend along the line 116 (FIG. 2). These rigid link means 206 provide the articulated connection between adjacent mower decks in accordance with the present invention. Each rigid link means 206 comprises a first link end 208 and means for rigidly attaching it, such as by welding, to the mower deck from which it extends and a second link end and means 212 for movably connecting it to the adjacent mower deck for at least limited swivel movement. The illustrative and preferred swivel means 212 is best seen in FIGS. 7 and 8 to comprise a post 214 extending vertically-upwardly from a post mount 216 which may be welded or otherwise rigidly secured to a deck.

It will be seen in FIGS. 1 and 2 that each of mower decks 90, 92, 94, 96 and 98 have a post 214 extending upwardly from a mounting 216. The connecting means 212 includes, for each post 214, a swivel sleeve 222 which is formed illustratively to have an internal diameter defined by an upwardly-opening upper frustoconical portion 224 and a downwardly-opening lower frustoconical portion 226 which connect together at the vertical center of the sleeve 222 to provide a central opening 228 just large enough in diameter slidably to receive the post 214. The illustrative sleeves 222 may be retained on their respective post, for instance, by the cotter pins 230 or any other conventional fastening elements. The upper and lower frustoconical portions 224, 226 permit the sleeve 222 to swivel relative to the post 214 or permit post 214 to swivel relative to the sleeve. This limited swivel connection is established by the unique double frustoconical portions 224, 226, and the limits on the swivel movement are determined by the angle of the frustoconical portions. For instance, it may preferably be advantageous to permit each sleeve 222 and its received post 214 to move at an angle of 12° which will permit each mower deck 90, 92, 94, 96, 98 to articulate relative to its adjacent mower deck by an angle of 12°. It has been found that when five mower decks are placed along the line 116 and pulled forwardly as indicated by the arrow 14 in FIG. 2, a 12° permitted articulation will permit the mower decks to move rather comfortably over very uneven terrain to follow that terrain and cut the grass very evenly. Since the decks 90, 92, 94, 96, 98 are permitted to articulate with the transfer belts 180 extending therebetween, the arrangement of the link means 206 disposed in the spaces provided by the belt 180 runs and in alignment with the axes of the pulleys about which the belts are trained will accommodate such articulation. These link means 206 provide ideal belt-take-up or tensioning means in the illustrative and preferred embodiment because each link means is provided with slide and guide portions 232, 234 which function as best seen in FIGS. 5 and 6. Each portion 232 is welded or otherwise rigidly attached to its associated mower deck to extend to the left (FIGS. 5 and 6). Each portion 234 is sleeved over the portion 232 to move thereon. This means that each swivel sleeve 222 may be adjusted in the direction of the extension of the portion 232. This adjustment is provided in the illustrative embodiment by a threaded rod 236 which extends through a bracket 238. Locking nuts 240 are provided on each side of each bracket 238 to position the threaded rod 236. Thus, the belt 180 associated with each rigid link means 206 may be adjusted or tensioned properly by adjusting the nuts 240 on the rod 236.

It will also be seen that the central opening 228 of each swivel sleeve is essentially aligned with the centers of the V-pulleys 172, 174 about which the associated belt 180 is trained. It has been found that the arrangement thus described works very well, particularly when the V-pulleys are radially deep and the V-belts 180 are trained deeply in the V-grooves.

Referring to the line 133 shown for the deck 96 in FIGS. 2 and 10, but applicable to all decks having a post 214, it will be seen that the line 133 passes generally through the swivel axis defined by the post. This arrangement permits each deck to move upwardly or downwardly about the line 133 as permitted by the sleeve 222 on its post 214. It has been found that this relationship, with the line 133 passing generally through the axis defined by the post 214 or below the post 214 will permit careful articulation of mower decks, i.e., allow even terrain following capability and keep the rotary blades at the appropriate height.

The line 133 generally under the post 214 axis for each deck 90, 92, 94, 96, 98, will prevent reactions that inappropriately lift other decks. It has been found, for example, that if the line 133 and post 214 arrangement does not exist, movement of deck 98 upwardly or downwardly on the terrain will cause inappropriate movement and uneven cutting of deck 90, two decks to the right of deck 98.

While the mower assembly just described is ideally suited for mowing golf course roughs which have many small hills and valleys completely covered with grass, it will be appreciated that the mower assembly may well be used on a wide variety of grass-covered areas including cemeteries, the yards surrounding businesses, etc. The unique deck pivots described herein permit the mower assembly flex joints to swivel in any direction. These simple pivots (swivel means 212 in FIGS. 7 and 8) are the key to allowing the assembly to make complex shifts required to roll over any terrain. They also restrict the amount of flex so that the angle between adjacent decks stays within the limits of proper belt tension and pulley angle. The mower assembly of the present invention, therefore, provides a low-cost, practical drive system comprising V-belts and V-pulleys which are simple and dependable.

In the cutting by the mower assembly 10, the plurality of small rotary mower decks 90, 92, 94, 96, 98 give a far superior cut when compared, for instance, to multiple blade, fixed-pan, rotary decks. The assembly of the present invention may have, for instance, 21 inch cut rotary decks such that five or seven rotary decks ganged together in accordance with the present invention will provide a very wide cut over very difficult, rolling areas that once required the use of small push mowers. With the assembly of the present invention, a single operator can cut as much turf as three to seven operators with push mowers and get the same quality cut.

In the illustrative and preferred embodiment of the mower assembly 10, these high quality articulating cut features are accomplished because the pivot point of each mower deck 90, 92, 94, 96, 98 is in substantial center of the belt 180 driving the blade 194 of the deck. This belt 180 is kept tight because the belt 180 drive centers, i.e., the centers of the belts and the pulleys, are generally aligned with the pivot centers.

By providing the proper belt tension by adjusting the threaded rods 236 relative to the bracket 238 and by providing relatively deep V-groove pulleys, the belts 180 can be maintained at proper driving tension to maintain the rotary speed of the blades 194 even when the mower decks 90, 92, 94, 96, 98 articulate to the extent permitted by the swivel joints shown clearly in FIGS. 7 and 8. As indicated above, it has been determined that a 12° articulation may well be ideal for mowing most rolling terrains.

Each of the mower decks 90, 92, 94, 96, 98 is supported on the ground at two angularly spaced-apart points, i.e., the front wheel means 130 and the back rear wheel means 132, while the deck teeters at a third point on the pivot or swivel centers best shown in FIGS. 7 and 8. The rearward or inwardmost inboard deck 98, is supported on an extra wheel means 134 as best seen in FIG. 1, but it also articulates relative to the adjacent deck 96 by the connecting means 212 (FIGS. 7 and 8). The deck 98 also is positioned and driven in a forward direction by the arm link means 46 which pivots relative to the deck 98 as indicated at 110. Similarly, the forwardmost or outermost outboard deck 94 is driven forwardly and positioned by the arm link means 42 which is pivotally connected to the deck as indicated at 108.

The rigid beam structure of the main frame means 12 controls the position of the central deck 90 with the universal joint means 76 described above such that the central deck 90, the forwardmost deck 94 and the rearwardmost deck 98 are driven and positioned by the main frame means 12 and the arm link means 42, 46. It will be appreciated, then, that the intermediate outboard deck 92 and the intermediate inboard deck 96 are controlled as to position and moved by their respective adjacent decks. These intermediate decks 92, 96 are permitted to articulate or float within the controlled limits of the swivel connecting means 212 shown in FIGS. 5, 6, 7 and 8.

While the five decks 90, 92, 94, 96, 98 shown in FIGS. 1 and 2 will make a very wide cut, it may be that a wider cut is desired in accordance with the present invention.

The FIG. 9 illustration shows how seven decks may be ganged together by adding still another outboard deck 94a and still another inboard deck 98a to the assembly. In FIG. 9, like reference numerals represent like parts. It will be seen that the decks 94a and 98a may be connected to their respective adjacent decks 94, 98 in the same fashion as the other adjacent decks are connected. In addition, a rigid link 250 may be swivelly connected at each of its ends to the rear wheel means 132 of decks 94 and 94a to position and control deck 94a. Similarly, a rigid link 252 may be swivelly connected at each of its ends to the rear wheel means 132 of decks 98, 98a to position and control deck 98a.

WHAT IS CLAIMED IS:

1. A gang mower assembly comprising rigid frame means elongated in the direction of forward movement of the mower assembly, said frame means including a forward end portion, a central portion, and a trailing end portion, a driver, a central rotary mower deck disposed adjacent said central portion, universal joint means for connecting said central deck to said central portion for at least limited universal movement relative to said frame means about axes generally parallel to said frame means and generally perpendicular to said frame means, at least one outboard rotary mower deck and at least one inboard rotary mower deck, ground-engaging wheel means for individually supporting each of said central, outboard and inboard decks for independent movement relative to each other and relative to said frame means, each of said decks comprising a rotary blade assembly defining a centrally located, upwardly extending rotary axis and pulley means mounted on said axis to provide an input drive for said blade assembly, means for positioning each deck relative to its adjacent deck, each said positioning means comprising rigid link means having first and second opposite link ends, means for attaching said first link end to one of said decks and means for movably attaching said second link end to an adjacent deck for at least limited swivel movement, and belt drive means for providing a driving connection from said driver to said pulley means, thereby to drive said rotary blade assembly of each mower deck.

2. The mower assembly of claim 1 further comprising a first arm link means for providing a positioning and driving connection between said forward end portion of said frame means and one of the outermost outboard decks and a second arm link means for providing a positioning and driving connection between said trailing end portion of said frame means and one of the innermost inboard decks, each said arm link means having a proximal end adjacent said frame means and a distal end adjacent one of said decks, means for connecting each arm link means for pivotal movement at its proximal end about an axis generally parallel to said frame means and means for connecting each arm link means for pivotal movement at its distal end to its associated mower deck about an axis generally parallel to said frame means.

3. The mower assembly of claim 1 in which said belt drive means comprises a main drive pulley on said driver, a main drive belt trained about said main drive pulley and said pulley means on said central mower deck, and transfer belt means for driving each said at least one inboard and each said at least one outboard mower decks from said pulley means on said central deck.

4. The mower assembly of claim 1 in which the upwardly extending axes of said rotary blade assemblies are disposed generally in an upwardly-extending reference plane positioned at an angle relative to said frame means and said mower decks are spaced apart along said plane, each said mower deck having a size such that the rotary cut it provides overlaps the cut of its adjacent mower deck upon forward movement of said frame means, and each said rigid link means of said positioning means extending generally in said reference plane between adjacent mower decks.

5. The mower assembly of claim 4 in which said belt drive means comprises a main drive pulley on said driver, a main drive belt trained about said main drive pulley and said pulley means on said central mower deck, and transfer belt means for driving each said at least one inboard and each said at least one outboard mower decks from said pulley means on said central deck.

6. The mower assembly of claim 5 including a plurality of said outboard mower decks and a plurality of said inboard mower decks, and said mower assembly further comprising a first arm link means for providing a positioning and driving connection between said forward end portion of said frame means and one of the outermost outboard decks and a second arm link means for providing a positioning and driving connection between said trailing end portion of said frame means and one of the innermost inboard decks, each said arm link means having a proximal end adjacent said frame means and a distal end adjacent one of said decks, means for connecting each arm link means for pivotal movement at its proximal end about an axis generally parallel to said frame means and means for connecting each arm link means for pivotal movement at its distal end to its associated mower deck about an axis generally parallel to said frame means.

7. The mower assembly of claim 6 in which said transfer belt means comprises a belt trained about said pulley means of adjacent mower decks to have a set of parallel belt runs extending between adjacent mower decks, one of said rigid link means being disposed between each set of said belt runs.

8. The mower assembly of claim 7 in which each said rigid link means comprises cooperating slide and guide end portions providing, respectively, said first and second opposite link ends, and adjustable belt take-up means for selectively positioning said end portions to provide selected tension on adjacent and associated belt runs.

9. The mower assembly of claim 8 in which said means for movably attaching said second link end to an adjacent deck comprises a post extending rigidly upwardly from said adjacent deck and a swivel sleeve receiving said post, said sleeve being rigidly mounted on said second link end, said swivel sleeve having an internal diameter defined by an upwardly opening upper frustoconical portion and a downwardly opening lower frustoconical portion, said upper and lower frustoconical portions connecting together to provide a common central opening sized slidably to receive said post and provide a pivot about said post limited by said upper and lower frustoconical portions.

10. The mower assembly of claim 9 in which said central opening is generally aligned with the associated and adjacent belt runs and the vertical centers of the pulley means about which the belt runs are trained.

11. The mower assembly of claim 9 in which said ground-engaging wheel means for each deck comprises a front wheel means and a rear side wheel means, each having a ground contact pont, such that a line drawn between said contact points will pass generally directly under said post.

12. The mower assembly of claim 4 in which said ground-engaging wheel means for each mower deck comprises a front wheel assembly and a rear side wheel assembly, each wheel assembly comprising a journal mounting bracket, a wheel journalled on said bracket for rotation about a generally horizontal axis, and means for connecting said journal mounting brackets to said mower deck for pivotal movement about an upwardly extending axis generally parallel to the upwardly extending axis of said rotary blade assembly for said deck, said rear side wheel assembly vertical axis being spaced relative to said rotary blade assembly axis by generally the same angle as the angle between said reference plane and a plane including said blade assembly axis and the upwardly-extending axis for said front wheel means.

13. The mower assembly of claim 1 in which said ground-engaging wheel means for each deck comprises a front wheel means and a rear side wheel means, each having a ground contact point, such that a line drawn between said contact points will pass generally directly under said means for movably attaching said second link end to an adjacent deck.

14. A gang mower assembly comprising a plurality of rotary mower decks connected together as a gang mower with adjacent decks staggered to provide overlapping cuts when the mower is moved in the forward direction, each mower deck comprising a rotary blade assembly defining a centrally located, upwardly extending rotary axis and pulley means mounted on said axis to provide an input drive for said blade assembly, means for positioning each mower deck relative to its adjacent deck, each said positioning means comprising rigid link means having first and second opposite link ends, means for attaching said first link end to one of said decks and means for movably attaching said second link end to an adjacent deck for swivel movement, said rigid link means lying generally in a straight line generally intersecting the rotary axes of said mower decks such that said decks are spaced along said straight line, and ground-engaging wheel means for individually supporting each of said decks for independent terrain following movement.

15. The mower assembly of claim 14 in which each said rigid link means comprises cooperating slide and guide end portions providing, respectively, said opposite link ends, and adjustable means for selectively positioning said end portions to position said opposite link ends, and the mower decks to which they are attached.

16. The mower assembly of claim 15 comprising a power transfer belt for each mower deck, each pulley means being drivingly connected to the pulley means of the adjacent mower deck by its associated power transfer belt, a driver having an output drive pulley, and a main drive belt trained about said output drive pulley and one of said mower deck pulley means to drive all of said rotary blade assemblies from said output drive pulley and said one of said mower deck pulley means.

17. The mower assembly of claim 15 comprising a driver having an output drive pulley mounted for rotation about a generally upwardly extending axis, a main drive belt trained about the drive pulley and the pulley means of a central one of said mower decks, and a transfer belt for providing a driving connection between each pulley means and its adjacent pulley means, thereby to drive all said rotary blade assemblies from said driver.

18. The mower of claim 17 in which said means for attaching said second link end to an adjacent deck for swivel movement comprises a post extending rigidly upwardly from said adjacent deck and a swivel sleeve receiving said post, said sleeve being rigidly mounted on said second link end, said swivel sleeve having an internal diameter defined by an upwardly opening upper frustoconical portion and a downwardly opening lower frustoconical portion, said upper and lower frustoconical portions connecting together to provide a common central opening sized slidably to receive said post and provide a pivot about said post limited by said upper and lower frustoconical portions.

19. The mower of claim 18 in which the centers of said central openings in said swivel sleeves are disposed generally in said straight line including the rotary axes of said mower decks and said rigid link means.

20. The mower of claim 19 in which each transfer belt has parallel runs on opposite sides of its associated rigid link means, said belt runs being generally at the same height as said central opening of said swivel sleeve disposed therein.

21. The mower of claim 20 in which each of said pulley means provides a radially deep V-groove having a radially inner bottom portion, each transfer belt riding in the radially inner bottom portions of the associated V-grooves, said adjustable means for selectively rigidly positioning said end portions serving as belt tensioning means respectively for said belts.

22. The mower of claim 14 in which said ground-engaging wheel means include a front wheel means and a rear wheel means for each deck defining ground contact points, respectively, such that a line drawn between said contact points will pass generally under said means for movably attaching said second link end to an adjacent deck.

23. A terrain-following gang mower assembly comprising a plurality of rotary mower decks arranged in a generally straight line inclined at an angle with respect to the forward direction of movement of said assembly with said rotary decks being spaced apart and sized to provide overlapping cuts as said assembly is moved forwardly, said inclined straight line arrangement providing a forwardmost mower deck and a rearwardmost mower deck, each of said mower decks comprising a centrally located drive shaft defining an upwardly extending axis and a rotary blade mounted on said shaft under said deck for cutting action when said shaft is driven, said shaft axes lying generally in said straight line, means for linking each deck to its adjacent deck, said linking means being disposed in said straight line, and frame means for moving said decks forwardly, said frame means comprising a first arm link means for providing a positioning and driving connection to the forwardmost mower deck and a second arm link means for providing a positioning and driving connection to the rearwardmost mower deck.

24. The mower assembly of claim 23 comprising universal joint means for providing a positioning and driving connection between said frame means and a centrally disposed one of said mower decks.

25. The mower assembly of claim 24 comprising a driver mounted on said frame means, said driver having output pulley means, pulley means mounted on each shaft, and belts trained about said pulley means to drive said rotary blades, said belts including a drive belt trained about and driving the pulley means on said centrally disposed one of said mower decks, and transfer belts coupling the last Said pulley means successively to the other pulley means.

26. The mower of claim 23 in which each said linking means provide a swivel joint on each said deck, and including a front wheel means and a right-rear wheel means for supporting each deck, each of said wheel means having a ground contact point such that a line drawn between said contact points will pass under said swivel joint.

27. A terrain-following gang mower assembly comprising a plurality of rotary mower decks arranged in a generally straight line inclined at an angle with respect to the forward direction of movement of said assembly with said rotary decks being spaced apart and sized to provide overlapping cuts as said assembly is moved forwardly, said inclined straight line arrangement providing a forwardmost mower deck and a rearwardmost mower deck, each of said mower decks comprising a centrally located drive shaft defining an upwardly extending axis and a rotary blade mounted on said shaft under said deck for cutting action when said shaft is driven, said shaft axes lying generally in said straight line, means for linking each deck to its adjacent deck, said linking means being disposed in said straight line, and ground-engaging wheel means for independently supporting each mower deck on terrain, each said wheel means comprising a wheel journal mounted for rotation about a horizontal axis and a caster for said wheel journal mounted about an upwardly-extending pivot axis on said deck, said wheel means for each deck comprising a front wheel having its pivot axis disposed generally in front alignment with said shaft axis for said deck and a rear side wheel having its pivot axis disposed at an angle generally equal and opposite to the angle of said straight line.

28. The assembly of claim 27 in which each said linking means provides at least a limited swivel connection between adjacent decks.

29. The assembly of claim 28 in which a line drawn generally between the ground points of contact for said front wheel and said rear side wheel passes generally under said limited swivel connection between adjacent decks.

* * * * *